(12) United States Patent
Ballew et al.

(10) Patent No.: US 6,575,280 B2
(45) Date of Patent: Jun. 10, 2003

(54) FREEWHEELING BI-DIRECTIONAL CLUTCH

(75) Inventors: William S. Ballew, McRae, GA (US); Charles W. Poole, Dublin, GA (US)

(73) Assignee: White Consolidated Industries, Inc., Cleveland, OH (US)

( * ) Notice: Subject to any disclaimer, the term of this patent is extended or adjusted under 35 U.S.C. 154(b) by 2 days.

(21) Appl. No.: 09/878,901

(22) Filed: Jun. 11, 2001

(65) Prior Publication Data

US 2002/0185353 A1 Dec. 12, 2002

(51) Int. Cl.[7] .............................................. F16D 41/12
(52) U.S. Cl. .......................... 192/46; 56/11.7; 192/50
(58) Field of Search .......................... 192/46, 35, 39, 192/52.6, 55.5, 50; 56/11.7

(56) References Cited

U.S. PATENT DOCUMENTS

| | | | | |
|---|---|---|---|---|
| 688,644 A | * | 12/1901 | Houghtaling | 192/46 |
| 756,086 A | * | 3/1904 | Weiler | 192/46 |
| 1,196,349 A | * | 8/1916 | Gilbert | 192/55.5 |
| 1,396,343 A | * | 11/1921 | Richardson | 192/46 |
| 2,366,912 A | * | 1/1945 | Lauper | 192/46 |
| 2,905,294 A | * | 9/1959 | Kellogg | 192/46 |
| 3,463,280 A | * | 8/1969 | Hoffman et al. | 192/35 |
| 4,126,214 A | * | 11/1978 | Kiss | 192/39 |
| 4,548,304 A | * | 10/1985 | Nagata | 192/46 |
| 4,692,825 A | * | 9/1987 | Debaudringhien | 192/46 |
| 4,909,365 A | | 3/1990 | Tillotson et al. | |
| 6,354,414 B1 | * | 3/2002 | Sueshige et al. | 192/35 |

* cited by examiner

Primary Examiner—Rodney H Bonck
(74) Attorney, Agent, or Firm—Pearne & Gordon LLP

(57) ABSTRACT

A clutch including a pawl having a base portion and an arm portion extending from the base portion; a drive disk adapted to be engaged by the pawl; a friction seal adapted to receive the drive disk; a drive retainer adapted to receive the pawl and a biasing spring that is engaged with the pawl and the drive retainer; and a pinion wheel having a plurality of teeth, wherein said pinion wheel is adapted to receive the drive retainer. The teeth of the pinion wheel operatively mesh with similarly designed teeth on a traction drive wheel which is also included in the traction drive wheel assembly. The clutch operates without the need for manual de-clutching and further without the need for the existence of frictional differentials between clutch members, induced through axial pressing together of clutch components by a thrust spring and through different sizes of frictional contact areas.

48 Claims, 10 Drawing Sheets

FREEWHEELING BI-DIRECTIONAL CLUTCH

FIELD OF THE INVENTION

The present invention relates to clutches, and more particularly to clutches used with outdoor power equipment, such as a self-propelled, walk-behind mower.

BACKGROUND OF THE INVENTION

Mechanical clutches are well known devices employed for selectively coupling a driving member with a driven member. Typically, such members rotate coaxially relative to one another. A wide variety of machinery utilize clutch devices, for example, outdoor power equipment, such as lawn equipment. More specifically, a certain class of lawn equipment commonly known as self-propelled, walk-behind mowers is known to use some form of clutch to transfer power from a main power source, frequently an internal combustion engine, to one or more of the mower wheels so as to allow the mower to move over grass and/or other vegetation to be mowed. Previous mowers in this class have been known to operate awkwardly and somewhat hazardously because their clutching means were designed to rapidly engage and to remain activated until the mower operator consciously and decisively deactivates the clutching means. This activation usually occurs by manipulating a clutch control device, the mowers almost instantaneously achieve a driven state upon clutch engagement and thereafter, they remain in a driven state until the operator manually disengages the clutching means via the clutch control device.

Instantaneous engagement of the clutch results in "jackrabbit" starts and a frequent need either to manually disengage the clutch or to apply extra muscle to maneuver the mower about the area to be mowed. Newer clutching means, known as freewheeling bi-directional clutches, are suitable for operatively coupling and decoupling a driven member with a driving member without the usual manual intervention. An example of one of these freewheeling bi-directional clutches is provided in U.S. Pat. No. 4,909,365 issued to Tillotson, et al. (hereinafter the "'365 Tillotson patent" or more simply "Tillotson").

The clutch taught by the '365 Tillotson patent is a friction-actuated clutch having among its critical design features, an internal, preferably metallic, key and a friction disk preferably made of plastic. The friction disk cooperatively engages the key so as to cause it to assume an extended, or cocked, state when a gearbox output drive shaft rotates in a particular direction and a retracted, or un-cocked, state when the gearbox output drive shaft ceases to rotate.

The key is configured to include a wedge portion and a tang portion extending from the wedge portion. The tang portion at all times floatingly resides fully in a tang relief formed by the friction disk. The wedge portion, when it is in its retracted or un-cocked state floatingly resides fully within a first axial keyway formed by the gearbox output drive shaft. The wedge portion, when it is in its extended or cocked state, floatingly resides partly in the first keyway and partly in one of a plurality of second axial passageways formed by a drive pinion that is also a component of the clutch design taught by the '365 Tillotson patent.

Another operative component of the clutch disclosed by the '365 Tillotson patent is a coiled thrust spring. The thrust spring along with the drive pinion and the friction disk are concentrically applied to the end portion of the output drive shaft that forms the first keyway and that projects outwardly from an orifice provided through a pivot housing. The end portion of the output drive shaft is provided with two axially spaced grooves on its outer surface. When applied to the output drive shaft, the friction disk, the drive pinion, the key and the thrust spring all lie between the two grooves. Both of the grooves are designed to receive a retainer clip. A first one of the grooves is situated on the output drive shaft so that it is adjacent to the portion of an outboard face of the pivot housing, which surrounds the orifice from which the gearbox output drive shaft protrudes. When fitted in the groove, the inboard face of the retainer clip abuts against the face portion of the housing and resists axial motion of the shaft relative to the housing.

A second of the grooves is positioned nearer to the end of the output drive shaft, and when the second retainer ring is fitted into the second groove, the thrust spring is compressed and an axially directed spring force, acting first through the drive pinion and then through the friction disk, presses the inboard face of the friction disk against the outboard face of the pivot housing, creating a state of static friction between the two surfaces. In a like manner, a portion of the inboard face of the drive pinion is pressed against the outboard face of the friction disk, also creating a state of static friction between these two surfaces. Because the inboard face of the drive pinion is outwardly bowed or crowned, and contacts the friction disk at a smaller radius than the radius at which the friction disk contacts the housing, a lesser amount of force is needed to cause motion of the drive pinion relative to the friction disk than is needed to cause motion of the friction disk relative to the housing. Consequently, when the drive shaft does not rotate, it is possible to maintain the key in a retracted or un-cocked state and for the pinion to freewheel relative to the drive shaft, the friction disk, and the housing.

Alternatively, when the drive shaft, and hence the first axial keyway formed thereby, is caused to begin rotating in a first direction relative to the housing, which direction is also toward the leading edge of the wedge portion of the key, friction force exerted by the friction drag disk against the tang portion of the key tends to rock the key so that a leading edge of the wedge portion become positively engaged with one of the plurality of second keyways provided in the drive pinion. When this happens, drive torque is transferred from the gearbox output shaft to the drive pinion and from the drive pinion to a traction drive wheel of the power implement. The result is self-propelled movement of the housing relative to the underlying ground surface.

When the output drive shaft ceases to rotate in the just described manner, the key is returned to its retracted or un-cocked state. Return of the key to the retracted state is accomplished by allowing the drive pinion to turn a short distance relative to the output drive shaft and to cause the key to be "wiped down" into the first axial keyway and to thereafter freewheel in either a clockwise or counterclockwise direction without re-cocking the key, until the drive shaft is again caused to rotate toward the leading edge of the wedge portion. During freewheeling, only the pinion gear rotates relative to the drive shaft. The friction disk remains stationary relative to the housing, the drive shaft and the drive pinion.

In view of the foregoing, it should be evident that the clutch design taught by the '365 Tillotson patent overcomes drawbacks associated with earlier clutch designs. The clutch design of the present invention also remedies the shortcomings of earlier clutches; however, it does so in a markedly different way than taught by the '365 Tillotson patent. A way that does not require the existence of friction differentials between a housing and a friction disk and between a drive pinion and the friction disk. The friction differentials in the present invention arise through the action of a thrust spring pressing the components axially together and through component features that result in different contact area sizes.

SUMMARY OF THE INVENTION

The present invention is directed to a powered implement, such as a self-propelled, walk-behind lawn mower provided with at least one traction drive wheel assembly including a bi-directional freewheeling clutch suitable for operatively coupling a driven member with a driving member. The driven member and the driving member are configured to rotate relative to a mower housing, the bi-directional freewheeling clutch comprising a pawl having a base portion and an arm portion extending from the base portion, and further the pawl having a neutral un-extended state, and an engaged extended state relative to the driving member. A drive disk concentric to the driving member and adapted to be engaged by the pawl. A friction seal concentric to the driving member and adapted to receive the drive disk. A drive retainer concentric to the driving member and adapted to receive the pawl and the biasing means. A biasing means engaged with the pawl and the drive retainer and a pinion wheel concentric to the driving member and adapted to receive the drive retainer. The pinion wheel is provided with a plurality of gear teeth that operatively mesh with a plurality of similarly designed gear teeth provided on a traction drive wheel.

When an output drive shaft operatively connected to a gearbox included on the mower is caused to rotate in a first rotational direction, the pawl, which includes a tang portion, is caused, through engagement with the drive disk, to assume the engaged, extended state and to thereby engage one of a plurality of projections provided in a recess portion of the pinion wheel. Engagement of the tang with one of the plurality of projections causes drive torque to be transferred from the drive shaft, through the driver retainer and the pawl to the pinion wheel. Drive torque is then transferred to the traction drive wheel and the mower is caused to move relative to an underlying ground surface through contact between the traction drive wheel and the ground through the plurality of gear teeth provided on the pinion wheel that mesh with the plurality of teeth provided on the traction drive wheel.

When the output drive shaft ceases to be driven by the gearbox and thus ceases to rotate in the first rotational direction, the traction drive wheel and the pinion wheel are free to continue rotating in the first rotational direction, and if they continue to do so through the effect of inertia and/or force applied by a human operator of the mower, the pawl disengages from the pinion wheel and through the action of a torsion spring connected to both the pawl and the drive retainer the pawl assumes the neutral, un-extended state. With the pawl in the neutral, un-extended state, both the traction wheel and the pinion wheel are free to rotate either in the first rotational direction or in an opposite second rotational direction, while the drive retainer and the drive shaft do not rotate.

Accordingly, it is an object of the present invention to provide a powered implement such as a self-propelled, walk-behind lawn mower, including at least one freewheeling, bi-directional clutch for operatively coupling and de-coupling a driven member without the need for manual de-clutching and further without the need for the existence of frictional differentials between clutch members, the frictional differentials being induced through axial pressing together of clutch components by a thrust spring and through different sizes of frictional contact areas.

This and other objects of the present invention will be made clear by reference to the detailed drawings and written description of the invention that are hereinafter provided.

DETAILED DESCRIPTION OF THE INVENTION

Figure 1:
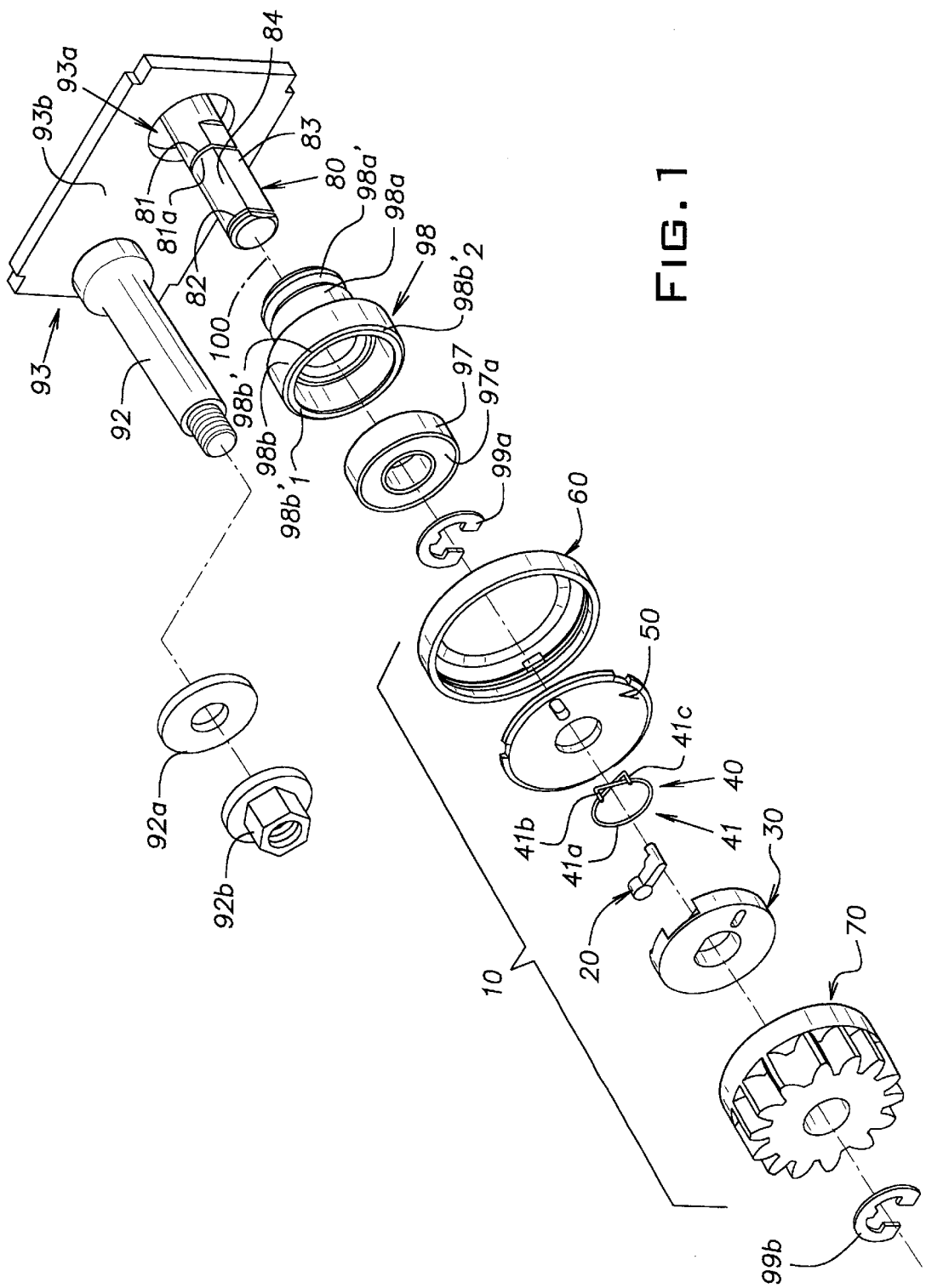
FIG. 1 is an exploded perspective view of the clutch of the present invention along with certain components of a traction drive wheel assembly into which the clutch may be operatively incorporated.
Figure 20:
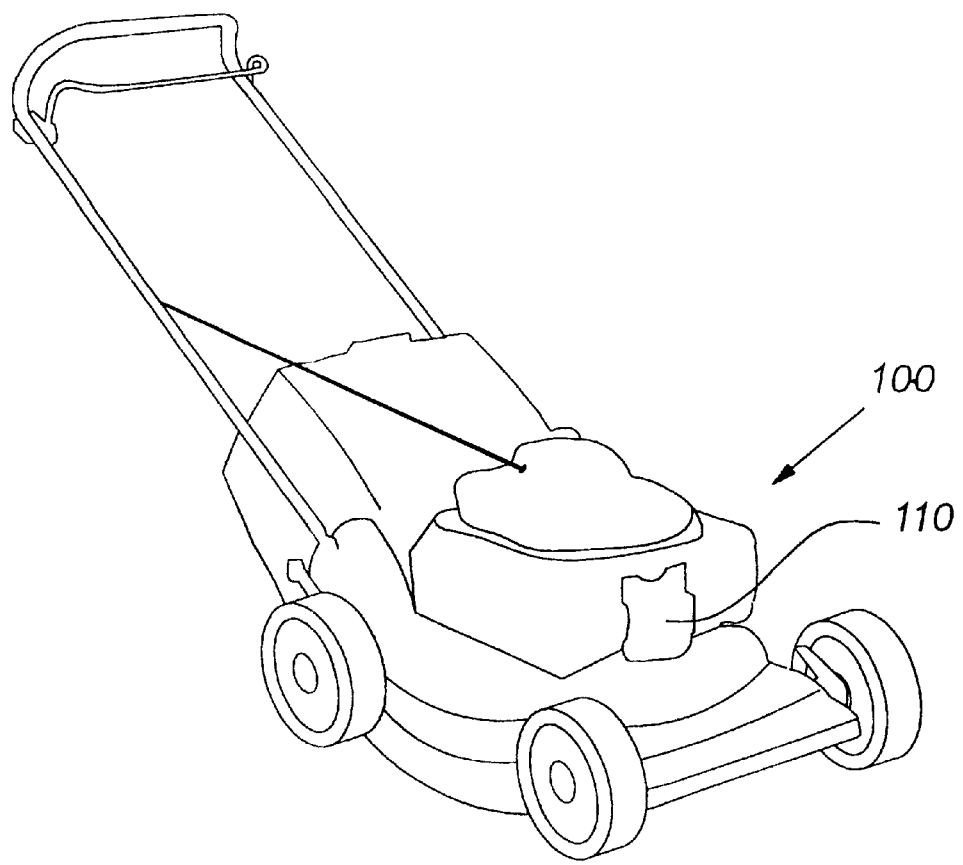
FIG. 20 is a perspective view of an example of the type of machinery that can use a clutch according to the present invention.
Figure 21:
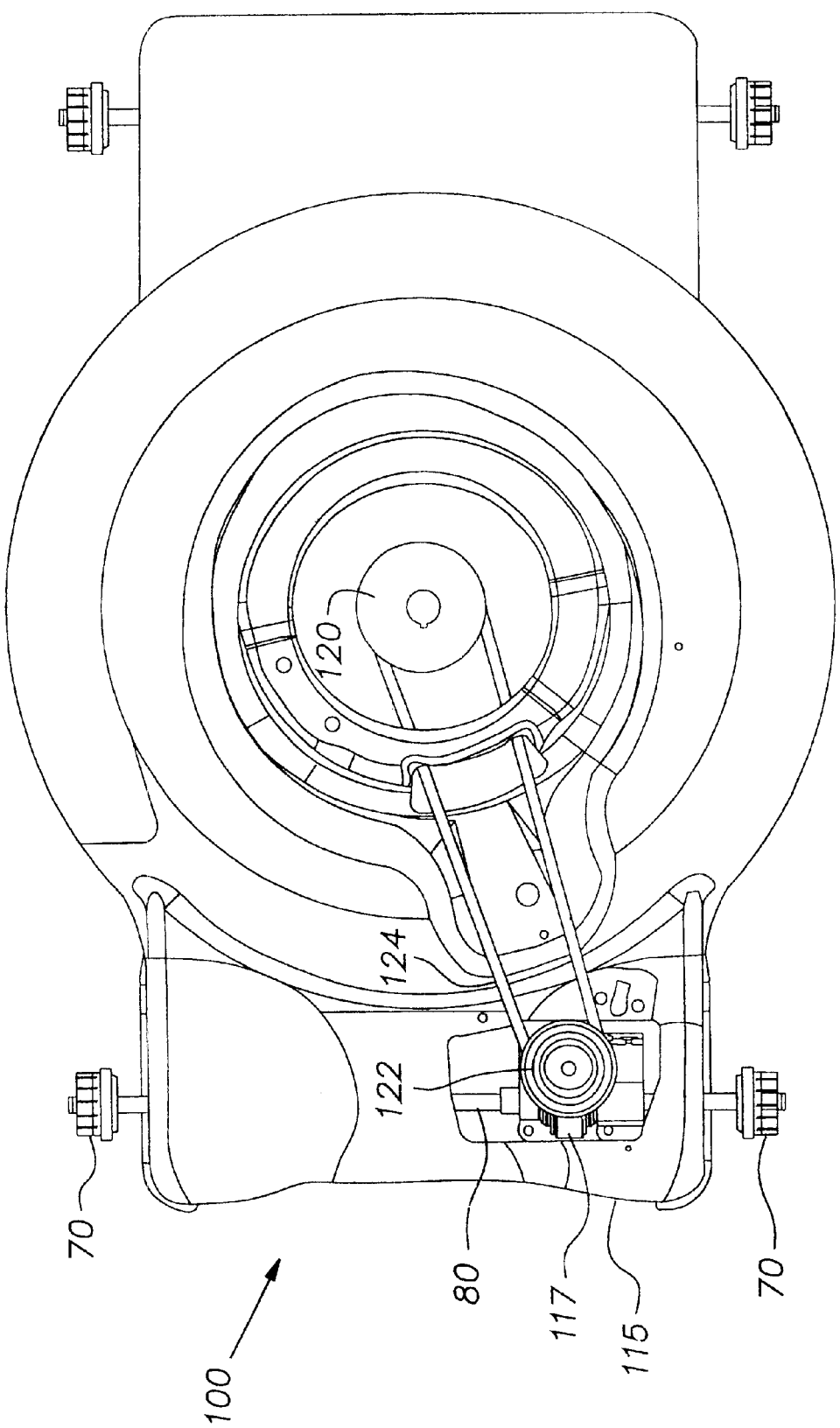
FIG. 21 is a bottom view of an example of a machine having the clutch according to the present invention.

A bi-directional freewheeling clutch according to the present invention is indicated generally in the drawings by the reference numeral 10. As indicated in FIG. 1, the clutch comprises a pawl 20, a drive retainer 30, a biasing means 40, a drive disc 50, a friction seal 60, and a pinion wheel 70. The clutch 10 is operatively connected to a rotatable driving means, or an output drive shaft 80, that in turn is operatively joined to a conventional gearbox 117 (FIG. 21) secured to a housing 115 of a powered implement, such as a walk-behind lawn mower 100 (FIG. 20). The gearbox further comprises a gearbox input drive shaft (not shown) and a gearbox pulley 122 operatively affixed to the gearbox input drive shaft. The powered implement, in addition to the gearbox 117, comprises a power source, or prime mover 110, attached to the housing 115. The primer mover 110 may be an internal combustion engine, an electric motor, or any other suitable motive means. The prime mover 110 includes a prime mover output drive shaft (not shown) and a prime mover output drive shaft pulley 120 operatively connected to the prime mover output drive shaft. A continuous drive belt 124 of a known variety, i.e., a V-belt, is operatively connected to the gearbox pulley 122 and to the primer mover output drive shaft pulley 120 so that driving power can be effectively transferred from the prime mover 110 to the gearbox 117 and to at least one traction drive wheel assembly also connected to the mower housing 115.

The gearbox further comprises a gearbox input drive shaft (not shown) and a gearbox pulley (not shown) operatively affixed to the gearbox input drive shaft. The mower, in addition to the gearbox, comprises a power source, or prime mover (not shown), attached to the housing. The prime mover may be an internal combustion engine, an electric motor, or any other suitable motive means. The prime mover includes a prime mover output drive shaft (not shown) and a prime mover output drive shaft pulley operatively connected to the prime mover output drive shaft. A continuous drive belt of known variety, i.e., a V-belt, is operatively connected to the gearbox pulley and to the prime mover output drive shaft pulley so that driving power can be effectively transferred from the prime mover to the gearbox and to at least one traction drive wheel assembly also connected to the mower housing.

Figure 2:
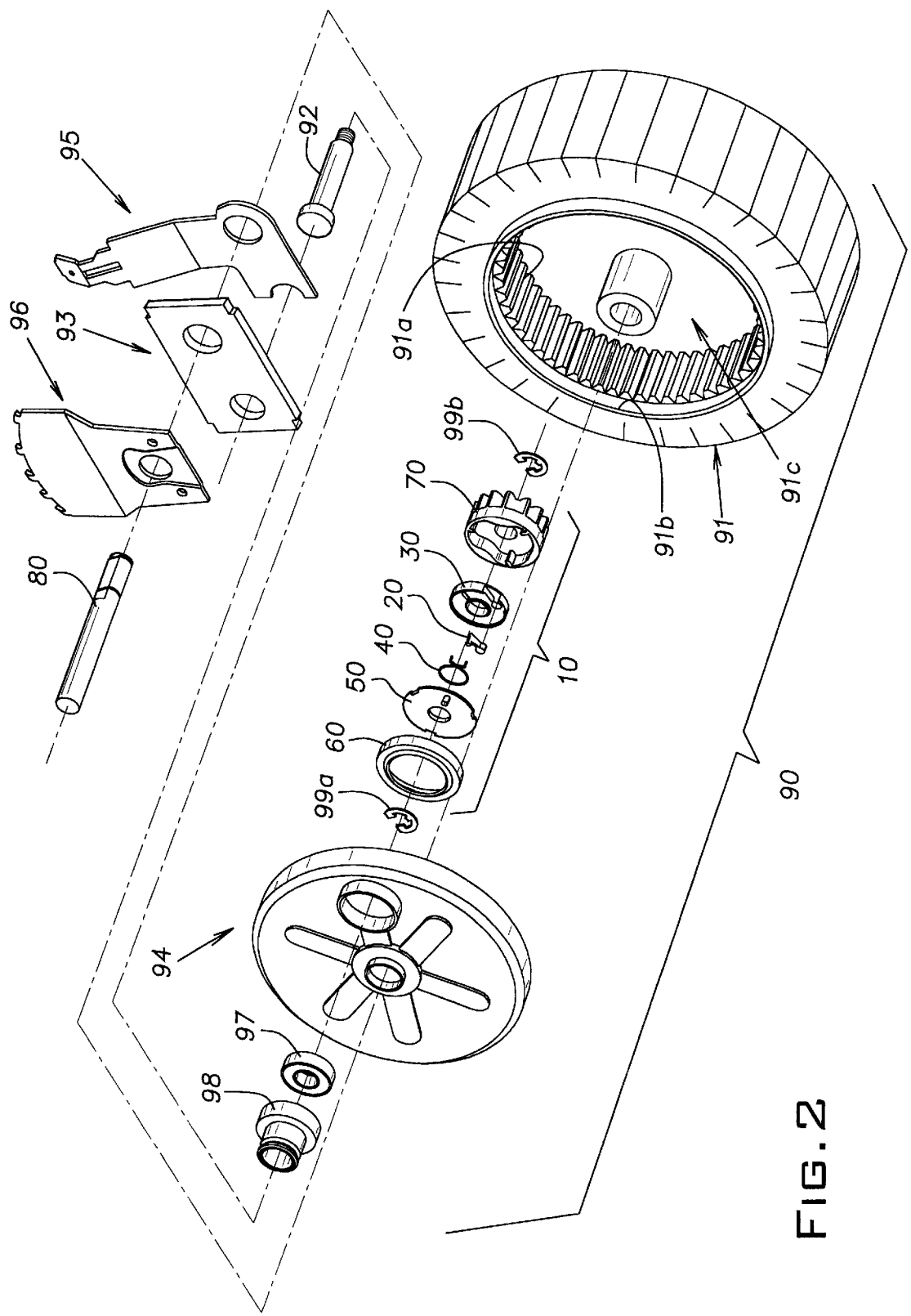
FIG. 2 is an exploded rear perspective view of a traction drive wheel assembly including the clutch of the present invention.

The clutch 10 of the present invention is part of a traction drive wheel assembly 90. As shown in FIG. 2, the traction drive wheel assembly 90, which is also connected to the mower housing, comprises: a traction drive wheel 91; a shoulder bolt that serves as an axle 92; an axle plate 93; a shield 94; a lever plate 95; a back plate 96; a bearing 97; a bearing retainer 98; and retaining rings 99a and 99b. The traction drive wheel 91 is concentrically received by the axle 92 that is firmly secured at one of its ends to the axle plate 93. The wheel 91 is kept on the axle 92 by fastening means 92a and 92b or by any other suitable fastening means. The traction drive wheel 91 is made preferably from a moldable substance, such as a suitably durable rubber or plastic compound, and is provided with a continuous series of gear teeth 91a. The gear teeth 91a are located circumferentially about an axially extending, cylindrical internal wall surface 91b that defines a recessed inner portion 91c of the traction drive wheel 91, and they extend transversely or axially, with respect to the wall surface 91b. The teeth 91a are provided for a purpose that will be hereinafter explained.

As shown in FIG. 1, the generally cylindrical output drive shaft 80 projects through an aperture 93a provided in the axle plate 93 so that the output drive shaft 80 is oriented substantially perpendicularly relative to the outboard face 93b of the axle plate 93 and so that the output drive shaft 80 is oriented substantially horizontal and parallel with the axle 92. The output drive shaft 80 is provided with at least one substantially flat surface area 83 that is utilized to operably engage the drive retainer 50 in a manner that will be described later.

The bearing retainer 98 is essentially comprised of two adjoining sections, both of which are generally cylindrical in shape. The first retainer section 98a has a greater overall axial length and a smaller outside diameter than the second retainer section 98b. (The outside diameter of the first retainer section 98a is slightly smaller than the diameter of the axle plate aperture 93a.) Both the first retainer section 98a and the second retainer section 98b have central, axially extending bores. The central, axially extending bore of the second retainer section 98b is substantially larger in diameter than the diameter of the central, axially extending bore of the first retainer section 98a, and the diameter of the central, axially extending bore of the first retainer section 98a is comfortably larger than the diameter of the output drive shaft 80. This diametral relationship between the axle plate aperture 93a and the outside diameter of the first retainer section 98a and between the output drive shaft 80 and the bore of the first retainer section 98a permits the bearing retainer 98 to concentrically receive the shaft 80 and the axle plate aperture 93a to concentrically receive the first section 98a of the retainer 98. The first section 98a is provided on its outer surface with a circumferentially extending groove 98a that is located just axially inward from the inboard end of the first section 98a. When the first section 98a is concentrically received by the aperture 93a, the inboard end of the first section 98a and the circumferentially extending groove 98a lie just beyond the inboard face 93c of the axle plate 93, and the circumferentially extending groove 98a then receives a conventional clip ring which abuts against the inboard face 93c (not shown) of the axle plate 93 and prevents axial displacement of the bearing retainer 98 relative to the axle plate 93. The second section 98b has an outboard circular edge 98b comprising a first face portion 98b_1 and a second face portion 98b_2. The first face portion $98b_1$ is oriented substantially perpendicular relative to the central longitudinal axis of the bearing retainer 98, and the second face portion $98b_2$ is sloped or chamfered outwardly away from the central longitudinal axis. The function of the second face portion $98b_2$ will be hereinafter explained.

The bearing 97 is preferably a conventional annular ball bearing assembly having a thickness comparable to the depth of the bore of the second section 98b, an outside diameter slightly smaller than the diameter of the bore of the section 98b and an inside diameter slightly larger than the output drive shaft 80. This dimensional configuration of the bearing 97 allows the bearing 97 to concentrically receive the shaft 80 and to be concentrically nested within the bore of the second section 98b. The bearing 97 is kept within the bore of the second section 98b and restrained against axial movement relative to the shaft 80 by a first retaining ring 99a that is received by a first retaining ring groove 81 provided on the output drive shaft 80. It will be understood that bearing 97 is retained in the described manner because when the bearing retainer 98 receives the shaft 80 and is secured to the axle plate 93, the outboard rim 98b (not shown) of the section 98b and the outboard face 97a of the bearing 97 both lie in a plane that extends perpendicularly to the shaft 80 and lies immediately adjacent to the inboard edge 81a of the groove 81 and hence the inboard face of the clip 99a contacts a portion of the outboard face 97a of the bearing 97, providing the necessary restraint.

Figure 3:
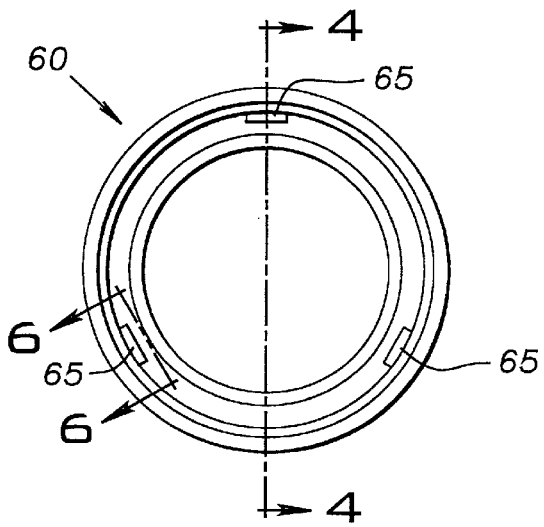
FIG. 3 is a front view of a friction seal of the clutch of the present invention.
Figure 4:
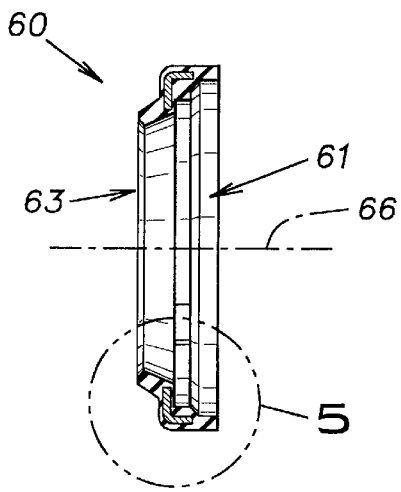
FIG. 4 is a side, cross-sectional view of the friction seal shown in FIG. 3 and taken along the line 4—4 therein.
Figure 5:
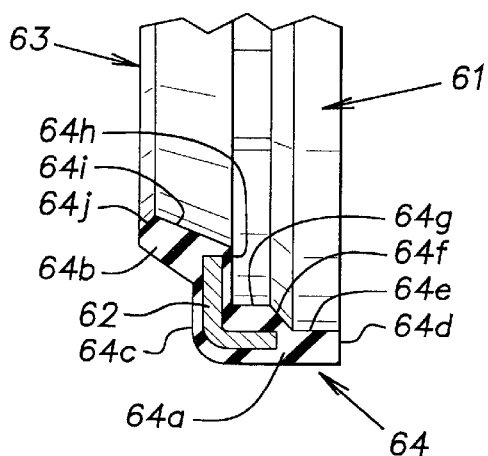
FIG. 5 is an enlarged view of the friction seal shown in FIG. 4 within the circled area designated 5 therein.

Turning now to the components of the clutch 10 of the present invention that are part of the traction drive wheel assembly 90, the friction seal 60, as indicated by FIGS. 3–5, is in general an annularly shaped structure comprising a ring-like, rigid internal core 62 and a relatively flexible external seal formation 64 bonded to and fully enveloping the core 62. As most clearly shown in FIG. 5, the core 62 has an L-shaped cross section and preferably is fabricated from carbon steel (SAE 1008-1010) and is finished with a gold bonding agent. The seal formation 64 integrally comprises a radially outer portion 64a that is generally axially extending, a radially inner portion 64b that extends both axially outward and radially inward relative to the radially outer portion 64a, and a radially extending intermediate portion 64c that joins the outer portion 64a and the inner portion 64b. The radially outer portion 64a includes an annular edge 64d that defines a first or outboard seal opening 61. The radially outer portion 64a further includes a first inner face 64e, a second inner face 64f and a third inner face 64g. The first inner face 64e extends axially inward from the annular edge 64d to the second inner face 64e. The second inner face 64f angularly extends away from the first inner face 64e and inward toward the third inner face 64g. The third inner face 64g extends axially inward from the second inner face 64f to a radially extending inner face 64h of the intermediate portion 64c of the seal formation 64, and an inner face 64i of the radially inner portion 64b of the seal formation 64 extends to an annular edge 64j of the radially inner portion 64b and defines a second or inboard seal opening 63. The annular edge 64j is sloped or chamfered inwardly toward the central axis 66 of the seal 64. The edge 64j is provided with substantially the same nominal diameter as the second face portion $98b_2$ of the circular edge 98b of the bearing retainer 98 and with a chamfer that is substantially equivalent in length and slope to the second face portion $98b_2$ so that the edge 64j and the second face portion $98b_2$ matingly abut one another when the traction drive wheel assembly 90 is in its assembled state.

Figure 6:
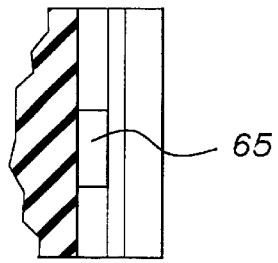
FIG. 6 is an enlarged cross-sectional view of the friction seal shown in FIG. 3 and taken along the line 6—6 therein.

As shown in FIGS. 3 and 6, the seal 64 further includes a plurality of stops 65 that project radially inward from the third inner face 64g of the seal outer portion 64a and axially outward from the inner face 64h of the intermediate portion 64c. The stops 65 are spaced apart circumferentially about the faces 64g and 64h at substantially equal intervals and they are utilized to engage the drive disk 50 in a manner that will be subsequently described. The stops 65 shown in FIGS. 3 and 6 are block-like in shape; however, it will be understood that the stops 65 can have any other shape that is suitable for their intended purpose.

Figure 10:
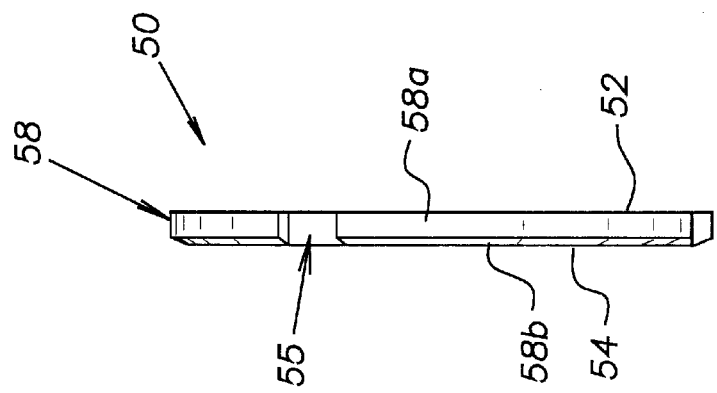
FIG. 10 is a side view of the drive disk shown in FIG. 9.
Figure 9:
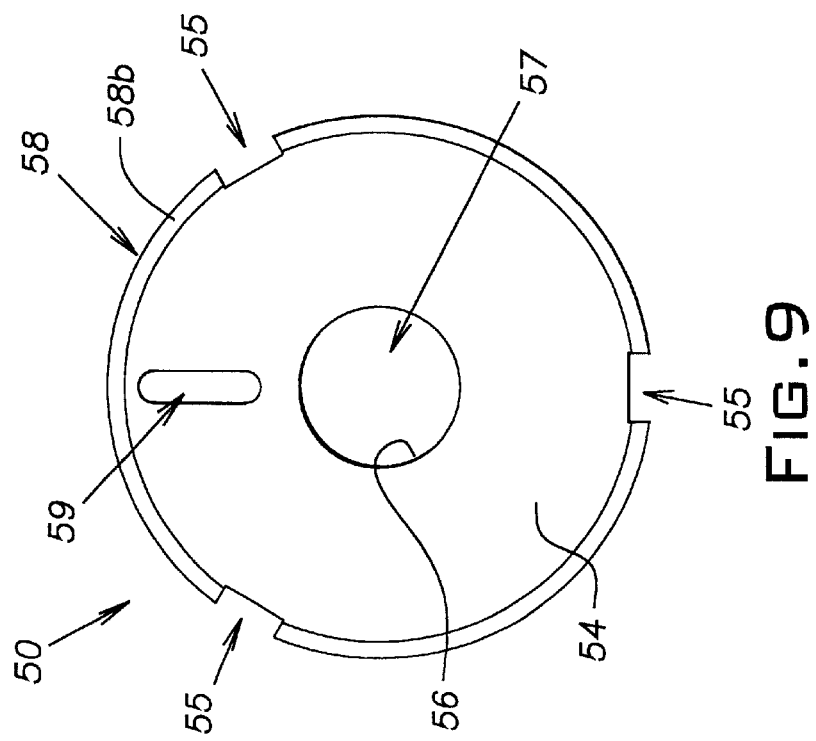
FIG. 9 is a front view of the drive disk of the clutch of the present invention.

As shown in FIGS. 9 and 10, the drive disk 50 is a thin, generally circular member preferably made from a metallic material such as MPIF FLC 4608-70 HT or any other suitable substance having an average hardness in a range of approximately RC 26-31 and a density of approximately 6.70 g/cc. The drive disk 50 comprises a generally annular first or inboard face 52, a generally annular second or outboard face 54, a circular inner edge 56 that defines a central aperture 57, and a generally circular outer edge 58. The circular outer edge 58 includes a first outer edge face 58a and a second outer edge face 58b. The first outer edge face 58a intersects the inboard face 52 at a substantially perpendicular angle, and the second outer edge face 58b intersects the outboard face 54 at an obtuse angle that preferably is approximately 120°. The central aperture 57 is sized so that its diameter is slightly larger than the diameter of the output drive shaft 80, enabling the aperture 57 to slidably receive the output drive shaft 80.

The circular outer edge 58 of the drive disk 50 is provided with a plurality of notches 55. The notches 55 extend radially inward toward the center of the disk 50 and axially between the inboard face 52 and the outboard face 54 of the disk 50. It will be understood that the overall diameter of the disk 50 is substantially the same as the diameter of the seal 64 at the third inner face 64g of the outer portion 64a of the seal 64 and that the notches 55 of the drive disk 50 have the same shape and dimensions and are spaced apart circumferentially about the outer edge 58 at substantially the same intervals as are the stops 65 of the seal 64. It will be further understood that these diametral and special relations between the disk 50 and the seal 64 make it possible for the notches 55 of the disk 50 and the stops 65 of the seal 64 to become axially aligned and for the disk 50 to be snugly received into the friction seal 60 so that: (i) peripheral portions of the inboard face 52 flatly contact the inner face 64h of the intermediate portion 64c of the seal 64, (ii) the first outer edge face 58a of the disk 50 contacts the third inner face 64g of the outer portion 64a of the seal 64, and (iii) the notches 55 of the disk 50 are engaged by the stops 65 of the seal 64. It will be understood also that when the drive disk 50 and the friction seal 64 are joined in the manner just described the notches 55 and the stops 65 prevent all rotational movement of the drive disk 50 and the friction seal 60 relative to one another and thus permit the disk 50 and the seal 60 to function as a unitary sub-assembly within the clutch 10 of the present invention. In addition to the plurality of notches 55, the drive disk is also provided with an elongated, radially extending aperture 59. The purpose of the elongated aperture 59 will be hereinafter explained.

Figure 12:
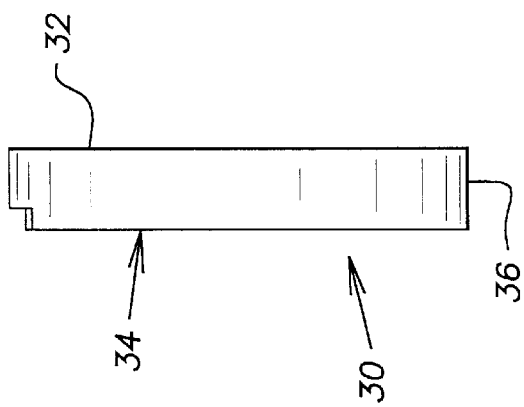
FIG. 12 is a side view of the drive retainer shown in FIG. 11.
Figure 11:
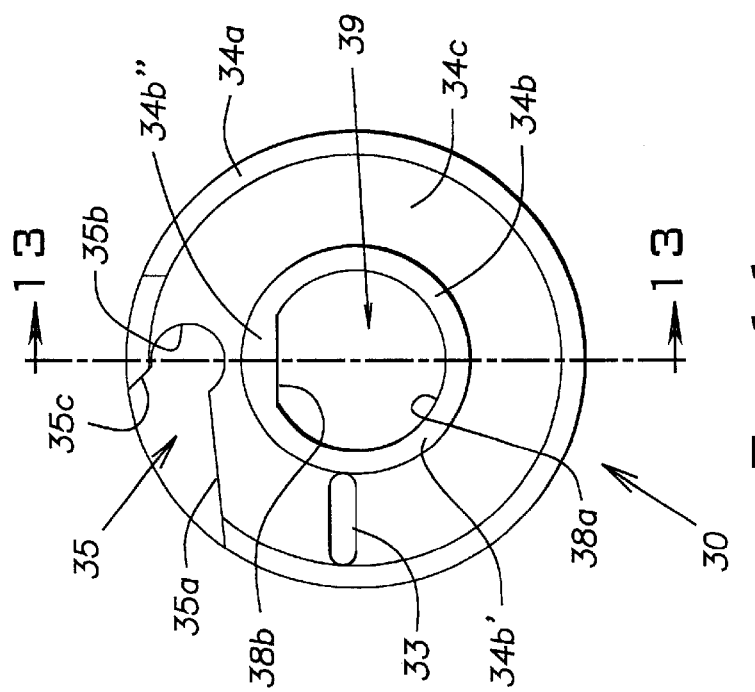
FIG. 11 is a front view of the drive retainer of the clutch of the present invention.
Figure 16:
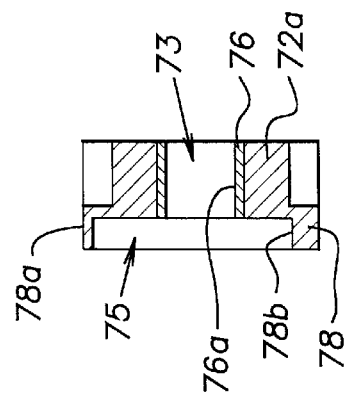
FIG. 16 is a side, cross-sectional view of the pinion (gear) wheel shown in FIG. 14 and taken along the line 16—16 therein.
Figure 15:
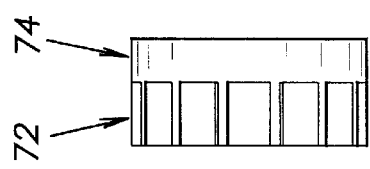
FIG. 15 is a side view of the pinion (gear) wheel shown in FIG. 14.
Figure 14:
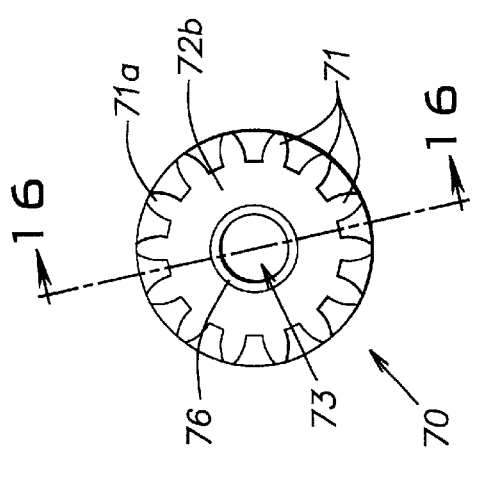
FIG. 14 is a front view of the pinion (gear) wheel of the present invention.
Figure 18:
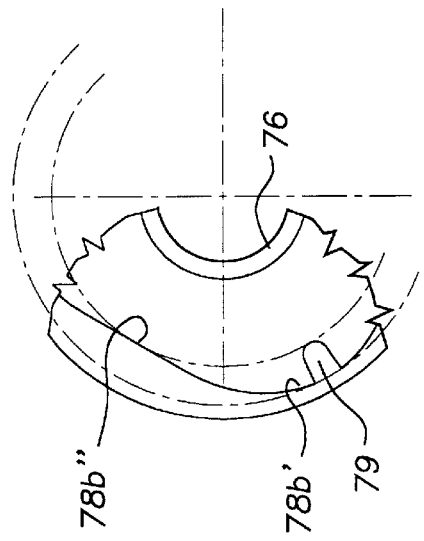
FIG. 18 is an enlarged view of the pinion (gear) wheel shown in FIG. 17 within the circled area designated 18 therein.
Figure 17:
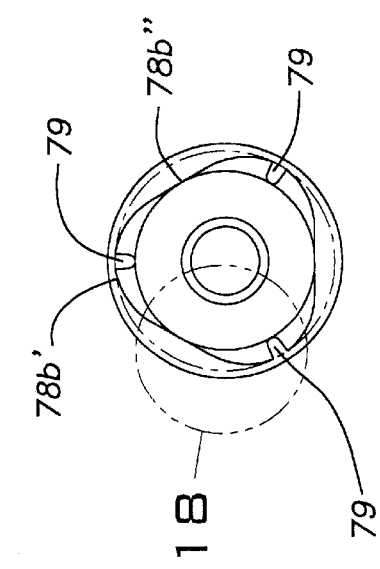
FIG. 17 is a rear view of the pinion (gear) wheel shown in FIG. 14.

As shown in FIGS. 11 and 12, the drive retainer 30 is a generally cylindrically shaped member comprising a radially extending outboard face 32, a radially extending inboard face 34, an axially and circumferentially extending peripheral face 36, and an axially and circumferentially extending interior face 38. The drive retainer is preferably fabricated from a metallic material such as MPIF FN 0208-HT or FLC 4608-70 HT or any other suitable substance having an average hardness in the range of approximately RC 26-36 and a density of approximately 6.70 g/cc. The outboard face 32 is flat, and the inboard face 34 is contoured to form a peripheral rib 34a, an interior rib 34b and a base 34c. As most clearly shown by FIGS. 11 and 13, the peripheral rib 34a extends circumferentially about a major portion of the outer perimeter region of the inboard face 34 and projects axially toward the drive disk 50. The interior rib 34b extends circumferentially about the whole of the inner perimeter region of the inboard face 34 and also projects axially toward the drive disk 50 by a distance that is substantially the same as the projection distance of the peripheral rib 34a. As clearly shown in FIG. 11, the interior rib 34b includes two portions: a first interior rib portion 34b' and a second interior rib portion 34b''. The first interior rib portion 34b' resembles a large circular arc having a constant radial width throughout. The second interior rib portion 34b'' resembles a small circular arc flattened on its innermost radial side and having a radial width that gradually increases from the width of the first interior rib portion 34b' at its first circumferential extremity to a maximum width at its mid point and then gradually decreases back to the width of the first interior rib portion 34b' at its second circumferential extremity.

It will be noted that the radially innermost edge of the interior rib 34b circumscribes the inboard edge of the axially and circumferentially extending interior face 38 so that the radially innermost edge of the first interior rib portion 34b' follows an arcuate portion 38a of the interior face 38 and further so that the radially innermost edge of the second interior rib portion 34b'' follows a flattened portion 38b of the interior face 38. The interior face 38 defines an axially extending passageway 39 through which the arcuate portion 38a and flattened portion 38b extend fully in the axial direction. It will be understood that the length of the flattened portion 38b of the interior face 38 is marginally longer than the width of the at least one substantially flat surface area 83 of the output drive shaft 80 and that the curvature and arc length of the arcuate portion 38a of the interior face 38 is marginally greater than the curvature and arc length of the outer curved surface 84 of the output drive shaft 80. These shape and dimensional relationships between the output drive shaft 80 and the passageway 39 of the drive retainer 30 ensure that, when the drive retainer 30 is concentrically applied to the output drive shaft 80, the flattened portion 38b of the interior face 38 of the drive retainer 30 will be radially adjoined by the substantially flat surface area 83 of the output drive shaft 80, and the arcuate portion 38a of the interior face 38 of the drive retainer 30 will be radially adjoined by the outer curved surface 84 of the output drive shaft 80. It will be understood that, with the flattened portion 38b adjoined by the flat surface area 83 and the arcuate portion 38a adjoined by the outer curved surface 84, drive torque will be transferred from the output drive shaft 80 to the drive retainer 30 when the drive shaft 80 is driven by the gearbox and the drive retainer will be caused to rotate in the same direction as the output drive shaft 80 and with the same rotational velocity. The significance of the drive retainer 30 being driven by the output drive shaft 80 in the just described manner will be explained hereinafter.

Figure 7:
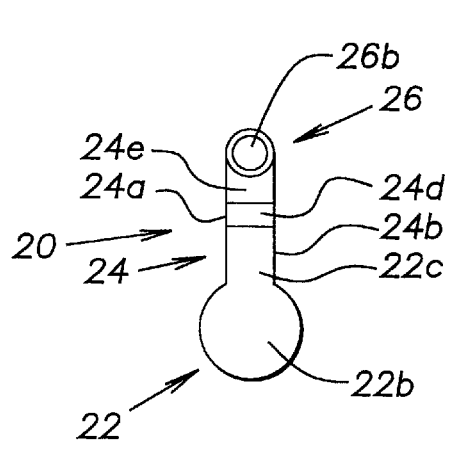
FIG. 7 is a front view of the pawl of the clutch of the present invention.
Figure 8:
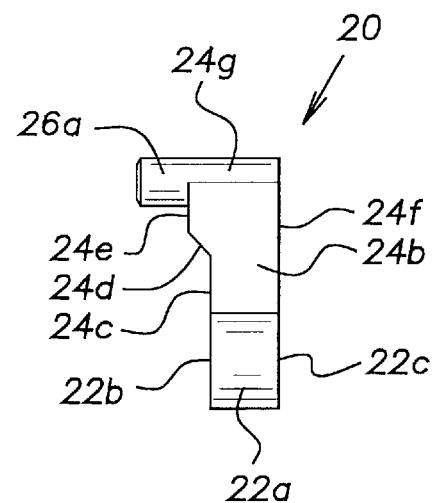
FIG. 8 is a side view of the pawl shown in FIG. 7.

Returning to the foregoing discussion relative to the inboard face 34 of the drive retainer 30, the ribs 34a and 34b along with the base 34c define a shallow, generally circular recess 31. Within the recess 31, an elongated, radial spaced aperture or slot 33 is defined in the base 34c by the drive retainer 30. The aperture or slot 33 extends axially through the retainer 30 from the outboard face 32 to the inboard face 34. The purpose of the slot 33 and the recess 31 will be explained hereinafter. The drive retainer 30 is further provided with a deep recess 35. The deep recess 35 is defined by a first axially extending chordal wall 35a, an axially extending arcuate wall 35b, a second axially extending chordal wall 35c, and a radially and chordally extending wall 35d. The deep recess 35 is configured to receive the pawl 20 depicted in FIGS. 7 and 8.

The pawl 20 is comprised generally of a cylindrical base portion 22 and an elongated arm portion 24 that projects radially and axially outward from the base portion 22. The pawl 20 is made preferably from a metallic material such MPIF FLC 4608-70 HT or any other suitable substance having an average hardness in the range of approximately RC 26-31 and a density of 6.70 g/cc. The base portion 22 forms an arcuate and axially extending surface 22a, a flat and radially extending inboard surface 22b and a flat and radially extending outboard surface 22c. The elongated arm portion 24 forms first and second axially extending surfaces 24a and 24b, first, second and third inboard flat surfaces 24c, 24d, and 24e, the outboard flat surface 24f, the curved end surface 24g, and the surfaces 26a and 26b that collectively constitute a projection or tang portion 26 extending axially inboard from the end of the arm portion 24. Regarding the just described surfaces of the base, arm and tang portions 22, 24 and 26 of the pawl 20, it will be recognized that certain surfaces, though identified by separate combinations of reference numbers and letters, actually make up one integral or continuous surface of the pawl 20. Such is the case for the inboard surfaces 22b and 24c, the outboard surfaces 22c and 24f, and the curved end surface 24 and a major portion of the surface 26a.

Figure 13:
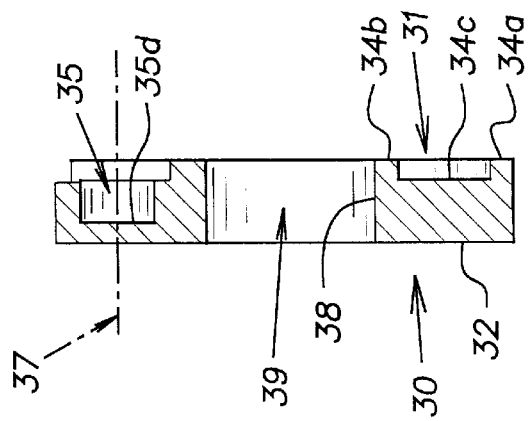
FIG. 13 is a side cross-sectional view of the drive retainer shown in FIG. 11 and taken along the line 13—13 therein.

The cylindrical base portion 22 of the pawl 20 is provided with an axial thickness, i.e., the distance between the inboard surface 22b and the outboard surface 22c, that corresponds to the axial depth, i.e., the distance between the wall 35d of the deep recess 35 and the base 34c of the shallow recess 31, and with diameter that is marginally smaller than the diameter of the region of the deep recess 35 that is defined by the axially extending arcuate wall 35c. Additionally, the arm portion 24 of the pawl 20 in the region bounded by the surfaces 22a, 22b, 22c and 24f is provided with an axial thickness, i.e., the distance between the surfaces 22c and 24f, that corresponds to the axial depth (distance between the wall 35d of the deep recess 35 and the base 34c of the shallow recess 31) of the deep recess 35. These dimensional correlations between the base portion 22 and the arm portion 24 of the pawl 20 and the deep recess 35 of the drive retainer 30 permit the pawl 20 to be received by the deep recess 35 so that: the flat outboard surfaces 22c of the base portion 22 and 24f of the arm portion 24 of the pawl 20 contacts the radially and chordally extending wall 35d of the deep recess 35; the curved and axially extending surface 22a of the pawl 20 lies adjacent to the axially extending arcuate wall 35b of the deep recess 35; and flat inboard surfaces 22b of the base portion 22 and 24c of the arm portion 24 of the pawl 20 lie substantially in the same radial plane as the base 34c of the shallow recess 31. With the pawl 20 received by the deep recess 35 in the fashion just described, clockwise and counterclockwise rotational movement of the pawl 20 substantially about the axis 39 shown in FIG. 13 is permitted. It will be noted that the axially extending chordal walls 35a and 35c of the deep recess 35 serve to limit rotational movement of the pawl 20 within the deep recess 35. Clockwise movement is limited by the wall 35c when it is engaged by the axially extending surface 24b of the arm 24, and counterclockwise movement is limited by the wall 35a when it is engaged by the axially extending surface 24a of the arm portion 24.

The limited rotational movement of the pawl 20 makes it possible for the pawl 20 to assume an extended or cocked state and a retracted or un-cocked state relative to the drive retainer 30. (It will be recognized that an infinite number of intermediate states can also be assumed.) In the fully extended or cocked state, the axially extending surface 24b of the arm portion 24 will be in contact with the chordal wall 35c and the arm portion 24 and the tang 26 extending axially therefrom will project outwardly relative to the drive retainer 30. In the fully retracted or un-cocked state, the axially extending surface 24a of the arm portion 24 will be in contact with the chordal wall 35a and the arm portion 24 and the tang 26 will lie wholly within the outer peripheral boundary of the drive retainer 30. The consequences associated with the pawl 20 being in the extended or cocked state or in the retracted or un-cocked state is discussed hereinbelow.

The biasing means 40 employed with the clutch 10 of the present invention is preferably a torsion spring 41. As indicated in FIG. 1, the torsion spring 41 comprises a ring-like main body portion 41a, a first axially outward extending spring end 41b, and a second axially outward extending spring end 41c. The main body portion 41a of the spring 41 is provided with an inside diameter and overall thickness in the axial direction so as to permit the body portion 41a to be loosely received within the shallow recess 31 of the drive retainer 30. The first axially outward extending spring end 41b and the second axially extending spring end 41c are capable of being separated a linear distance that is sufficient to allow the first spring end 41b to overlap the inboard side of the arm portion 24 of the pawl 20 and to engage the axially extending surface 24b of the arm portion 24 and to further allow the second spring end 41c to be received by the aperture or slot 33 of the drive retainer 30. It will be understood that with the first spring end 41b and the second spring end 41c respectively engaged with the arm portion 24 and the slot 33 and with the spring body portion 41a situated within the shallow recess 31, the torsion spring 41 will cause the pawl 20, and more specifically the arm portion 24 thereof, to be rotatively biased toward the wall 35a of the deep recess 35. The significance of this aspect of the clutch 10 of the present invention will be hereinafter discussed.

When the drive retainer 30, the pawl 20 and the torsion spring 41 are configured in the manner just described, they collectively form yet another sub-assembly of the clutch 10 of the present invention that is received by the gearbox output drive shaft 80 after the sub-assembly comprising the drive disk 50 and the friction seal 60 are received by the shaft 80 is applied to the shaft 80. It will be understood that, when the sub-assembly comprising the drive retainer 30, the pawl 20 and the torsion spring 41 is mounted to the output drive shaft 80 in accordance with the present invention, the peripheral rib 34a and the interior rib 34b of the inboard face 34 of the drive retainer 30 abuts against the outboard face 54 of the drive disc 50, the projection or tang 26 of the pawl 20 is received by the elongated, radially extending aperture 59 provided in the drive disc 50, and the outboard face 54 of the drive disk 50 cooperates with the ribs 34a and 34b to loosely retain the cylindrical base portion 22 and the elongated arm portion 24 of the pawl 20 within the deep recess 35 of the drive retainer 30 and further to loosely retain the torsion spring 41 within the shallow recess 31 of the drive retainer 30. The outboard face 54 of the drive disk 50 also functions to prevent axial movement of the first and second spring ends 41b and 41c and thus serves to ensure that the first spring end 41b continues to overlap the inboard side of the arm portion 24 of the pawl 20 and to engage the axially extending surface 24b of the arm portion 24 and that the second spring end 41c remains positioned in the aperture or slot 33 of the drive retainer 30. The reason for having the drive retainer 30 abutted against the drive disk 50 in the manner just described will become clear in view of the discussion provided hereinbelow.

As shown in FIGS. 14–18, the pinion wheel 70 of the clutch 10 of the present invention is generally a cylindrically-shaped member comprising an axially outboard portion 72 and an axially inboard portion 74 that is constituent to the outboard portion 72. The axially outboard portion 72 forms a plurality of radially extending gear teeth 71 and a central, axially extending bore 73. The axially inboard portion 74 forms a central, axially extending recess 75 that openly communicates with the bore 73 of the outboard portion 72. The bore 73 preferably receives a thin-walled, axially extending bushing 76. The outboard portion 72 and the inboard portion 74 of the pinion wheel 70 and the bushing 76 are preferably made of metallic substances. In the case of the outboard portion 72 and the inboard portion 74, a sintered iron metal such as MPIF FN 0208-105HT is preferred; however, any other suitable substance may be used. In the case of the bushing 76, a copper-based bronze such as MPIF CT 0010R oil impregnated per ASTM B438-73 Grade I, Type II is preferred; however, any other suitable substance may be used. The axially inboard portion 74 includes an axially and radially extending wall 78. The wall 78 has an outer face 78a which, when viewed in the axial direction, is circularly shaped. The wall 78 further has an inner face 78b that is provided with a plurality of radially and axially extending projections 79. The inner face 78b and the projections 79 collectively form the axially extending recess 75. It will be noted that the inner face 78b of the wall 78, when viewed in the axial direction, is generally trefoil shaped, i.e., the inner face 78b has three evenly spaced apart arcuate portions 78b, each of which has one of the projections 79 situated at the apex of the arcuate portion and the inner face 78b further has three straight portions 78b" which link the arcuate portions 78b. This trefoil shape of the inner face 78b and the placement of the projections 79 as indicated on the face 78b give the recess 75 distinctive qualities that will be hereinafter discussed.

Turning now to the plurality of gear teeth 71 formed by the outboard portion 72 of the pinion wheel 70, the teeth project radially outward from and extend axially along a central, annularly shaped region 72a. While the teeth 71 can be of any form and number suitable for the purpose hereinafter described, the tooth form ANSI full depth involute has been found to be particularly desirable for the pinion wheel 70 of the clutch 10 of the present invention. It is also desirable that the pinion wheel include approximately 14 teeth having a diametral pitch of approximately 10, a pressure angle of approximately 20 degrees and a standard pitch diameter of 1.400 inches. It will be noted that the apex 71a of each of the teeth 71 is located at a radial distance from the central longitudinal axis of the pinion wheel 70 that is substantially the same as the radial distance that the outer face 78a of the inboard portion 74 is from the central longitudinal axis of the pinion wheel 70.

As indicated in FIG. 1, the drive pinion 70 is applied to the output drive shaft 80 after the sub-assembly including the friction seal 60 and the drive disk 50 and the sub-assembly including the drive retainer 30, the pawl 20 and the biasing means 40 have been applied to the shaft 80 in the manner described hereinabove. When the drive pinion 70 is applied to the shaft 80, the shaft 80 is received by the bore 73 so that the outer curved surface 84 of the shaft 80 contacts the inner surface 76a of the bearing 76 and so that the radially extending face 72b of the outboard portion 72 of the drive pinion 70 lies just axially inboard of the second retaining ring groove 82 provided on the output drive shaft 80. With the radially extending face 72b is so positioned, the second retaining ring 99b is fitted into the groove 82 and the inboard radially extending face of the ring 99b abuts against a portion of the face 72b of the pinion wheel 70 and the ring 99b thereby prevents any axially outward movement not only of the pinion wheel 70, but also of the sub-assembly including the friction seal 60 and the drive disk 50 and the sub-assembly including the drive retained 30, the pawl 20 and the biasing means 40.

As indicated in FIG. 2, when the pinion wheel is positioned on the output drive shaft 80 in the manner just described, a series of the gear teeth 71 are meshed with a series of the gear teeth 91a provided on the internal wall surface 91b of the recessed inner portion 91c of the traction drive wheel 91. It will be understood that the gear teeth 91a of the traction drive wheel 91 and the gear teeth 71 of the pinion wheel 70 are designed to effectively mesh together and to thus smoothly and continuously maintain contact and rotate together.

As earlier indicated, the clutch 10 of the present invention operates in a manner that permits coupling and de-coupling of a driven member without the need for manual de-clutching and further without the need for the existence of frictional differentials between clutch members, the frictional differentials being induced through axial pressing together of clutch components by a thrust spring and through different sizes of frictional contact areas. The following description of the operation of the clutch 10 of the present invention will explain how such coupling and de-coupling is achieved.

Figure 19:
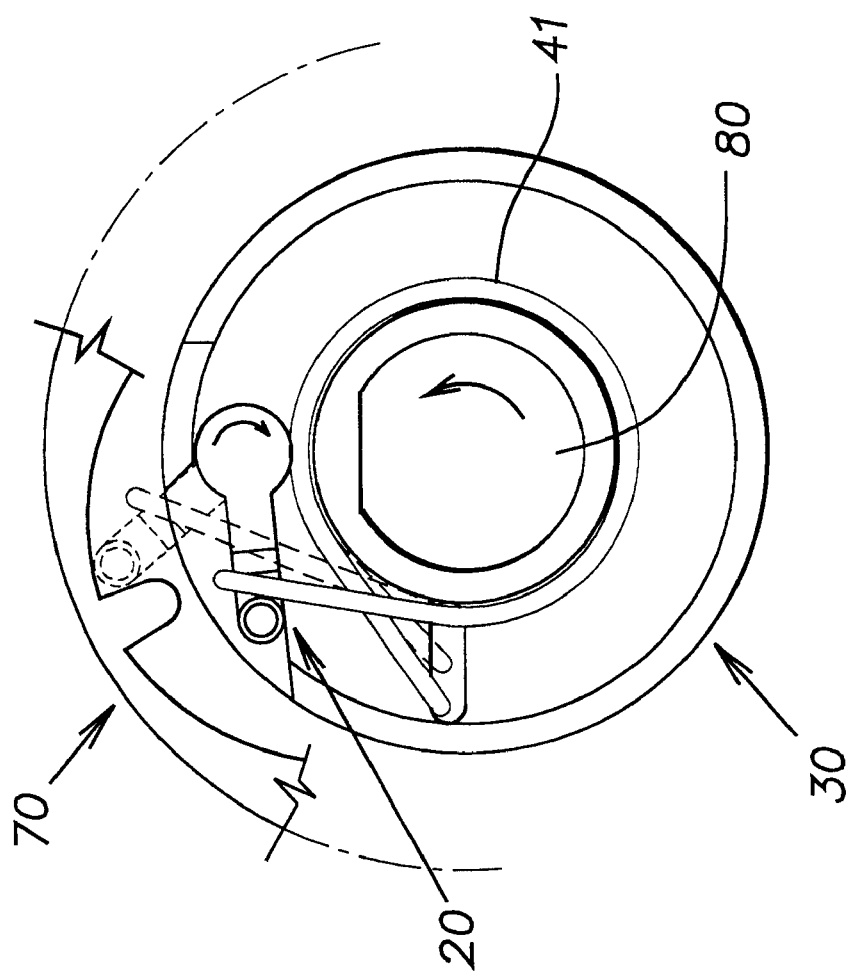
FIG. 19 is an axial view of the inboard sides of the drive retainer, pawl and pinion (gear wheel, illustrating positioning of the pawl when it assumes a cocked and un-cocked state.

Because the annular edge 64j of the radially inner portion 64b that defines the second or inboard seal opening 63 of the friction seal 60 abuts against the second face portion $98b_2$ of the outboard circular edge 98b of the bearing retainer 98, friction between the annular edge 64j and the second face portion $98b_2$ causes the friction seal 60 and the drive disk 50 to remain rotationally stationary relative to the output drive shaft 80. When the output drive shaft 80 is caused to begin rotating in a first rotational direction as indicated in FIG. 19, the drive retainer 30 also begins to rotate in the first rotational direction and the projection or tang 26 of the pawl 20 which is loosely retained in the deep recess 35 of the drive retainer and which is engaged in the elongated, radially extending aperture 59 provided in the drive disk 50 is pressed against an adjacent, radially extending side wall of the aperture 59, and because the side wall remains stationary, the tang 26 is caused to slidably move radially outward along the side wall relative to the drive retainer 30 and against the force of the torsion spring 41. As the drive retainer continues to rotate in the first rotational direction, the tang 26 continues its radially outward journey until it reaches the most radially outward portion of the aperture 59 at which point the pawl 20 is considered to be in an extended or cocked state, as shown in FIG. 19. With the pawl 20 in the extended or cocked state the drive retainer continues to rotate until the tang 26 engages one of the radially and axially extending projections 79 situated in the recess 75 provided in the inboard portion 74 of the pinion wheel 70. When the tang 26 engages one of the projections 79, drive torque is transmitted from the drive retainer 30 through the pawl 20 and to the pinion wheel 70 with the result that the pinion wheel 70 and the plurality of gear teeth 71 provided thereon are caused to rotate with the drive retainer 30 and the output drive shaft 80. Because the gear teeth 71 provided on the outboard portion 72 of the pinion wheel 70 are meshed with the teeth 91a provided on the traction drive wheel 91, drive torque is further transferred from the rotating pinion wheel 70 to the traction drive wheel 91 which is caused to also rotate until the output drive shaft 80 ceases to rotate in the first rotational direction.

When the drive shaft 80 ceases to rotate in the first rotational direction, the traction drive wheel ceases to be driven; however, it may continue to rotate in its previously driven direction due to inertial effects and/or the application of a forward pushing force on the lawn mower by the human operator. Regardless of its cause, continued un-driven rotation of the traction drive wheel 91 causes the pinion wheel 70 to continue rotating also, and this continued rotation of the pinion wheel results in the tang 26 of the pawl 20 to become disengaged from the projection 79 provided in the recess 75 of the pinion wheel 70. When the tang 26 becomes disengaged from the projection 79, the biasing force exerted by the torsion spring 41 against the arm portion 24 of the pawl 20 causes the pawl to be drawn back toward the arm portion 24 rests against the first axial chordal wall 35a of the deep recess 35. When the arm portion 24 rests against the chordal wall 35a, no portion of the pawl extends beyond the axially and circumferentially extending face 36 of the drive retainer 30, and the pawl is considered to be in a retracted or un-cocked state, as also shown in FIG. 19. It will be recognized that the pawl 20 will remain in the retracted or un-cocked state until the output drive shaft 80 is caused to rotate in the first rotational direction again. It will also be recognized that while the pawl 20 is in the retracted or un-cocked state the traction drive wheel 91 and the pinion wheel 70 can, upon application of either pushing or pulling force by the human operator of the mower, rotate freely either in the first rotational direction or in a second rotational direction opposite to the first rotational direction. Thus, the traction drive wheel 91 and the pinion wheel 70 achieve a freewheeling state relative to the mower housing while the drive retainer 30 and the output drive shaft 80 do not rotate relative to the housing.

While a preferred embodiment of the invention is described above, those skilled in the pertinent art will recognize that many embodiments are possible within the scope and spirit of the invention. Variations and modifications of the various parts and assemblies can be made and still fall with scope and spirit of the invention. Therefore, the invention is limited only to the apparatus recited in the following claims, and all equivalent thereto.

What is claimed is:

1. A powered implement comprising:
   (a) a housing;
   (b) a prime mover;
   (c) a traction drive wheel assembly rotatably coupled to the housing for propelling the powered implement along the ground;
   (d) a driving member operably coupled to the prime mover;
   (e) a driven member operably coupled to the traction drive wheel assembly; and
   (f) a clutch suitable for operatively coupling the driven member with the driving member, wherein the driven and the driving members are configured to rotate relative to the housing, and wherein the clutch comprises:
      (i) a pawl having a base portion and an arm portion extending from the base portion, and further having a neutral, un-extended state and an engaged, extended state relative to the driving member;
      (ii) a drive disk concentric to the driving member and adapted to be engaged by the pawl;
      (iii) a friction seal concentric to the driving member and adapted to receive the drive disk;
      (iv) a drive retainer concentric to the driving member and adapted to receive the pawl and biasing means, the biasing means being engaged with the pawl and the drive retainer; and
      (v) a pinion wheel concentric to the driving member and adapted to receive the drive retainer.

2. An implement according to claim 1, wherein the biasing means is a torsion spring concentric to the driving member and having a first axially outward extending spring end and a second axially extending outward spring end, the first spring end received by a radial spaced aperture provided in the drive retainer and the second spring end engaging the pawl so as to cause the pawl to be biased inwardly relative to the drive retainer when the pawl is in the engaged, extended state.

3. An implement according to claim 2, wherein the aperture provided in the drive retainer for receiving the first spring end is a radially extending slot.

4. An implement according to claim 2, wherein the second spring end contacts the arm portion of the pawl.

5. An implement according to claim 1, wherein the arm portion of the pawl includes an axially inward extending tang and the drive disk includes a radially spaced aperture provide in the drive disk, the axially inward extending tang received by the radially spaced aperture.

6. An implement according to claim 5, wherein the axially inward extending tang is an axially inward extending prong and the radially spaced aperture is a radially extending slot.

7. An implement according to claim 1, wherein the drive disk is provided with a plurality of notches and the friction seal is provided with a plurality of stops corresponding in number to the plurality of notches and located and sized to be received by the notches so as to prevent rotational movement of the drive disk relative to the friction seal.

8. An implement according to claim 7, wherein the notches are provided circumferentially about an outer edge of the drive disk and are equidistantly spaced apart and the stops are provided circumferentially about an axially extending interior surface of the friction seal and are spaced apart to permit engagement with the notches.

9. An implement according to claim 1, wherein the drive retainer is provided with a first recess for receiving the biasing means and a second recess for receiving the pawl.

10. An implement according to claim 9, wherein the first recess communicates with the second recess and is annularly shaped and concentric to driving means.

11. An implement according to claim 10, wherein the second recess is polygonally shaped and includes a first chordal wall, a second chordal wall and an arcuate wall intermediate to and intersecting with the first chordal wall and the second chordal wall.

12. An implement according to claim 1, wherein the pinion wheel is provided with a pinion wheel recess for receiving the drive retainer.

13. An implement according to claim 12, wherein the pinion wheel recess has an axially extending peripheral wall that includes a plurality of axially and radially inwardly extending projections.

14. An implement according to claim 13, wherein the peripheral wall of the recess resembles a trefoil and the plurality of projections comprises three tooth-like projections located individually at a first rounded apex, a second rounded apex and a third rounded apex of the recess.

15. An implement according to claim 1, wherein driving means rotate in a first rotational direction relative to the housing, the drive retainer also rotates in the first rotational direction and thereby causes the pawl engaged with the drive to become movably transformed from the un-extended state to the extended state wherein, in the extended state, the pawl engages the pinion wheel so as to cause the pinion wheel to rotate relative to the housing in the first rotational direction of the driving means and so as to further cause the traction drive wheel to rotate relative to the housing in the first rotational direction of the driving means.

16. An implement according to claim 15, wherein when the driving means ceases to rotate in the first rotational direction relative to the housing, the drive retainer ceases to rotate in the same first rotational direction of the driving means, the pinion wheel continues to rotate in the first rotational direction, the pawl disengages from the pinion wheel, the biasing means returns the pawl to the un-extended state, and the traction drive wheel thereby acquires a freewheeling state.

17. A traction drive system for a powered implement having a housing, a prime mover, a prime mover output shaft, and a traction drive wheel assembly, the traction drive system comprising:
  (a) a gear box suitable for pivotally mounting to the housing and comprising a gear box input shaft and a gear box output shaft suitable for coupling to the traction drive wheel assembly;
  (b) a prime mover pulley suitable for mounting on the prime mover output shaft;
  (c) a gear box pulley mounted on the gear box input shaft;
  (d) a belt for interconnecting the pulleys when the gear box is appropriately pivoted relative to the housing; and
  (e) a bi-directional freewheeling clutch suitable for operatively coupling the gear box output shaft and the drive wheel assembly wherein when the gear box is appropriately pivoted and the gear box output shaft is caused to rotate, the clutch is activated by contact with the gear box output shaft, thereby allowing torque to transfer between the gear box output shaft and the drive wheel assembly, whereas when the gear box shaft is not rotated there is no appreciable torque transfer between the drive wheel assembly and the gear box output shaft and the drive wheel assembly can freewheel in either direction, wherein the bi-directional freewheeling clutch comprises:
    (i) a pawl having a base portion and an arm portion extending from the base portion, and further having a neutral, un-extended state and an engaged, extended state relative to a driving member;
    (ii) a drive disk concentric to the driving member and adapted to be engaged by the pawl;
    (iii) a friction seal concentric to the driving member and adapted to receive the drive disk;
    (iv) a drive retainer concentric to the driving member and adapted to receive the pawl and biasing means, the biasing means being engaged with the pawl and the drive retainer; and
    (v) a pinion wheel concentric to the driving member and adapted to receive the drive retainer.

18. A traction drive system according to claim 17, wherein the biasing means is a torsion spring concentric to the driving member and having a first axially outward extending spring end and a second axially extending outward spring end, the first spring end received by a radial spaced aperture provided in the drive retainer and the second spring end engaging the pawl so as to cause the pawl to be biased inwardly relative to the drive retainer when the pawl is in the engaged, extended state.

19. A traction drive system according to claim 18, wherein the aperture provided in the drive retainer for receiving the first spring end is a radially extending slot.

20. A traction drive system according to claim 18, wherein the second spring end contacts the arm portion of the pawl.

21. A traction drive system according to claim 17, wherein the arm portion of the pawl includes an axially inward extending tang and the drive disk includes a radially spaced aperture provide in the drive disk, the axially inward extending tang received by the radially spaced aperture.

22. A traction drive system according to claim 21, wherein the axially inward extending tang is an axially inward extending prong and the radially spaced aperture is a radially extending slot.

23. A traction drive system according to claim 17, wherein the drive disk is provided with a plurality of notches and the friction seal is provided with a plurality of stops corresponding in number to the plurality of notches and located and sized to be received by the notches so as to prevent rotational movement of the drive disk relative to the friction seal.

24. A traction drive system according to claim 23, wherein the notches are provided circumferentially about an outer edge of the drive disk and are equidistantly spaced apart and the stops are provided circumferentially about an axially extending interior surface of the friction seal and are spaced apart to permit engagement with the notches.

25. A traction drive system according to claim 17, wherein the drive retainer is provided with a first recess for receiving the biasing means and a second recess for receiving the pawl.

26. A traction drive system according to claim 25, wherein the first recess communicates with the second recess and is annularly shaped and concentric to driving means.

27. A traction drive system according to claim 26, wherein the second recess is polygonally shaped and includes a first chordal wall, a second chordal wall and an arcuate wall intermediate to and intersection with the first chordal wall and the second chordal wall.

28. A traction drive system according to claim 17, wherein the pinion wheel is provided with a pinion wheel recess for receiving the drive retainer.

29. A traction drive system according to claim 28, wherein the pinion wheel recess has an axially extending peripheral wall that includes a plurality of axially and radially inwardly extending projections.

30. A traction drive system according to claim 29, wherein the peripheral wall of the recess resembles a trefoil and the plurality of projections comprises three tooth-like projections located individually at a first rounded apex, a second rounded apex and a third rounded apex of the recess.

31. A traction drive system according to claim 17, wherein when driving means rotate in a first rotational direction relative to the housing, the drive retainer also rotates in the first rotational direction and thereby causes the pawl engaged with the drive to become movably transformed from the un-extended state to the extended state wherein, in the extended state, the pawl engages the pinion wheel so as to cause the pinion wheel to rotate relative to the housing in the first rotational direction of the driving means and so as to further cause a traction drive wheel included in the traction drive wheel assembly to rotate relative to the housing in the first rotational direction of the driving means.

32. A traction drive system according to claim 31, wherein when the driving means ceases to rotate in the first rotational direction relative to the housing, the drive retainer ceases to rotate in the same first rotational direction of the driving means, the pinion wheel continues to rotate in the first rotational direction, the pawl disengages from the pinion wheel, the biasing means returns the pawl to the un-extended state, and the traction drive wheel thereby acquires a freewheeling state wherein the traction drive wheel can rotate either in the first rotational direction or in a second opposing rotational direction.

33. A bi-directional freewheeling clutch suitable for operatively coupling a driven member with a driving member, wherein the driven member and the driving member are configured to rotate relative to a housing, the clutch comprising:
   (a) a pawl having a base portion and an arm portion extending from the base portion, and further having a neutral, un-extended state and an engaged, extended state relative to the driving member;
   (b) a drive disk concentric to the driving member and adapted to be engaged by the pawl;
   (c) a friction seal concentric to the driving member and adapted to receive the drive disk;
   (d) a drive retainer concentric to the driving member and adapted to receive the pawl and biasing means, the biasing means being engaged with the pawl and the drive retainer; and
   (e) a pinion wheel concentric to the driving member and adapted to receive the drive retainer.

34. A clutch according to claim 33, wherein the biasing means is a torsion spring concentric to the driving member and having a first axially outward extending spring end and a second axially extending outward spring end, the first spring end received by a radial spaced aperture provided in the drive retainer and the second spring end engaging the pawl so as to cause the pawl to be biased inwardly relative to the drive retainer when the pawl is in the engaged, extended state.

35. A clutch according to claim 34, wherein the aperture provided in the drive retainer for receiving the first spring end is a radially extending slot.

36. A clutch according to claim 34, wherein the second spring end contacts the arm portion of the pawl.

37. A clutch according to claim 33, wherein the arm portion of the pawl includes an axially inward extending tang and the drive disk includes a radially spaced aperture provide in the drive disk, the axially inward extending tang received by the radially spaced aperture.

38. A clutch according to claim 37, wherein the axially inward extending tang is an axially inward extending prong and the radially spaced aperture is a radially extending slot.

39. A clutch according to claim 33, wherein the drive disk is provided with a plurality of notches and the friction seal is provided with a plurality of stops corresponding in number to the plurality of notches and located and sized to be received by the notches so as to prevent rotational movement of the drive disk relative to the friction seal.

40. A clutch according to claim 39, wherein the notches are provided circumferentially about an outer edge of the drive disk and are equidistantly spaced apart and the stops are provided circumferentially about an axially extending interior surface of the friction seal and are spaced apart to permit engagement with the notches.

41. A clutch according to claim 33, wherein the drive retainer is provided with a first recess for receiving the biasing means and a second recess for receiving the pawl.

42. A clutch according to claim 41, wherein the first recess communicates with the second recess and is annularly shaped and concentric to driving means.

43. A clutch according to claim 42, wherein the second recess is polygonally shaped and includes a first chordal wall, a second chordal wall and an arcuate wall intermediate to and intersection with the first chordal wall and the second chordal wall.

44. A clutch according to claim 33, wherein the pinion wheel is provided with a pinion wheel recess for receiving the drive retainer.

45. A clutch according to claim 44, wherein the pinion wheel recess has an axially extending peripheral wall that includes a plurality of axially and radially inwardly extending projections.

46. A clutch according to claim 45, wherein the peripheral wall of the recess resembles a trefoil and the plurality of projections comprises three tooth-like projections located individually at a first rounded apex, a second rounded apex and a third rounded apex of the recess.

47. A clutch according to claim 33, wherein when driving means rotates in a first rotational direction relative to the housing, the drive retainer also rotates in the first rotational direction and thereby causes the pawl engaged with the drive to become movably transformed from the un-extended state to the extended state wherein, in the extended state, the pawl engages the pinion wheel so as to cause the pinion wheel to rotate relative to the housing in the first rotational direction of the driving means and so as to further cause a traction drive wheel included in a traction drive wheel assembly attached to the housing to rotate relative to the housing in the first rotational direction of the driving means.

48. A clutch according to claim 47, wherein when the driving means ceases to rotate in the first rotational direction relative to the housing, the drive retainer ceases to rotate in the same first rotational direction of the driving means, the pinion wheel continues to rotate in the first rotational direction, the pawl disengages from the pinion wheel, the biasing means returns the pawl to the un-extended state, and the traction drive wheel thereby acquires a freewheeling state wherein the traction drive wheel can rotate either in the first rotational direction or in a second opposing rotational direction.

* * * * *

UNITED STATES PATENT AND TRADEMARK OFFICE
CERTIFICATE OF CORRECTION

PATENT NO. : 6,575,280 B2  
DATED : June 10, 2003  
INVENTOR(S) : William S. Ballew et al.

It is certified that error appears in the above-identified patent and that said Letters Patent is hereby corrected as shown below:

Column 5,  
Line 7, please delete "(gear", and insert therefor -- (gear) --.  
Line 49, please delete the paragraph which begins "The gearbox further comprises a…", and ending at column 5, line 64, which concludes with "…connected to the mower housing.".

Signed and Sealed this

Twentieth Day of January, 2004

JON W. DUDAS  
*Acting Director of the United States Patent and Trademark Office*